April 7, 1942.    G. I. BROWN    2,279,106
ANIMAL FEED
Filed Sept. 13, 1939
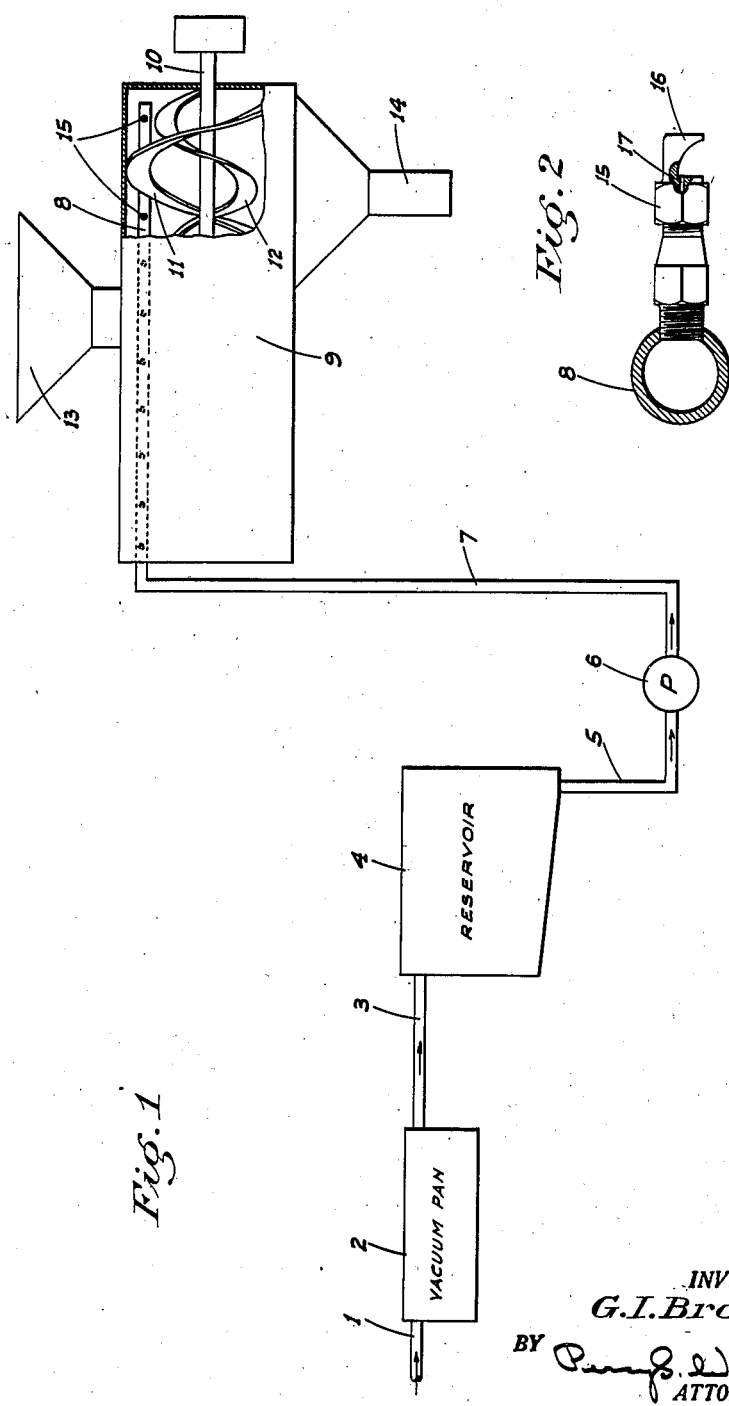
INVENTOR.
G. I. Brown
BY
ATTORNEY Patented Apr. 7, 1942

2,279,106

UNITED STATES PATENT OFFICE 2,279,106

ANIMAL FEED

Guy I. Brown, Modesto, Calif.

Application September 13, 1939, Serial No. 294,639

1 Claim. (Cl. 99—4)

This invention relates in general to an animal feed and the process employed to produce such feed; the invention being directed particularly to the manufacture of poultry feed.

The principal object of the present invention is to provide poultry feeds which comprise whole or cracked grains, or mill feeds, the particles of which are coated or sealed with a nutritive and preserving agent; this agent being a condensed milk product and preferably condensed buttermilk.

Another object of the invention is to provide a novel process for preparing the product as described above.

A further object of the invention is to produce a simple and yet unique animal feed and process of preparing the same, and which will be exceedingly effective for the purpose for which it is designed.

These objects I accomplish in the manner as will fully appear by a perusal of the following specification and claim.

In the drawing similar characters of reference indicate corresponding parts in the several views:

Figure 1 is a diagrammatic elevation of one form of apparatus which may be used to practice the process.

Figure 2 is an enlarged side elevation of one of the spray nozzles.

I refer now more particularly to the characters of reference on the drawing and to the characteristics of the product and details of the process.

A milk product, preferably fresh buttermilk, is heated to approximately 130° F. and fed from a suitable source of supply (not shown) through a pipe 1 into a vacuum pan 2 of ordinary type and wherein this liquid buttermilk is condensed at a low temperature until the content of solids is from 30% to 35% of the total volume treated. The temperature at which the buttermilk is condensed in the vacuum pan is 137° F. and this is relatively critical. A few moments before the condensed but yet fluid buttermilk is withdrawn from the vacuum pan the temperature is raised to 142° F. The buttermilk is then promptly withdrawn through a pipe 3 into a reservoir 4.

From this reservoir the buttermilk passes through an outlet pipe 5 and is fed into a sanitary pump 6 of conventional type and such as is commonly used in creameries, etc. From pump 6 the condensed and still warm buttermilk is forced under pressure through pipe 7 which connects with a horizontal pipe 8 disposed longitudinally within the casing or shell 9 of a conventional dual auger feed mixer.

This mixer includes a driven horizontal shaft 10 disposed longitudinally in the shell 9; such shaft supporting an outer auger conveyor 11, and an inner reverse auger 12, both augers being of the band type. A hopper 13 feeds into the shell from the top and centrally of its ends, while a discharge chute 14 is formed in connection with the shell at one end.

The horizontal pipe 8 is disposed adjacent the top of the shell and laterally offset from the outer auger conveyor. A plurality of spray jets 15, each having outwardly sloping and downwardly facing baffles 16 in front of the jet opening 17, are connected with pipe 8 in spaced relation and project horizontally inward or toward the auger conveyor.

Cracked grain or other feed to be processed is fed into the mixer through hopper 13 and in the mixer the feed is first fed in one direction by one auger and then, as a separate stream or strata, in another direction by the other auger and thence out through chute 14 for sacking. While in the mixer, the feed is subjected to a pressure spray of the condensed buttermilk introduced into the jets 15 under pressure from pump 6; the baffles 16 breaking the jet stream into a fine but forceful spray or mist. Each particle of the feed is thus covered with a thin, uniform layer, or seal coat, of condensed buttermilk. The proportionate quantity of condensed buttermilk sprayed into any given batch of feed is approximately 5% by weight and in no event above 7%; this latter percentage being critical. The quantity of condensed buttermilk used, as above, while being sufficient to properly coat and seal the particles, is only sufficient to raise the moisture content of the feed approximately 3 to 4%. By maintaining such low percentage of moisture increase, the processed feed, when sacked, does not heat or tend to mold and dries in the sack satisfactorily. Further, as the heat at the time of condensing is relatively low certain bacteria remain active to prevent spoiling of the product.

The advantages of the feed produced by the above process are many:

By sealing the exterior surface of the particles of feed with the condensed buttermilk, the albumen and milk sugar contained in the buttermilk not only add to the nutritive value of the feed but also act as agents to seal or insulate the particles of feed against oxidization and prevent its otherwise detrimental effect on the feed. All of the essential feed values are preserved, and the product remains palatable indefinitely. The condensing step of the process raises the milk sugar content of the buttermilk approximately 17% which is a very desirable factor.

The product, especially when prepared as a poultry feed, assures rapid and better growth due to the effective utilization of the feed values and which is brought about by the bacterial action of the buttermilk on the enzymes in the nutritional tract of the birds or animals.

The processed feed contains the valuable elements of fresh buttermilk, the sealing action prevents vitamin loss, and the digestability and assimilation of the feed is increased as previously explained.

In certain instances the buttermilk may be condensed for future use and in such event the fluid and condensed buttermilk will be placed in sterile containers and hermetically sealed.

From the foregoing description it will be readily seen that I have produced such an animal feed and process of preparing the same as substantially fulfills the objects of the invention as set forth herein.

While this specification sets forth the preferred details of the invention, still in practice such deviations from such details may be resorted to as do not form a departure from the spirit of the invention as defined by the appended claim.

Having thus described my invention, what I claim as new and useful and desire to secure by Letters Patent is:

A food product comprising a mass of edible particles and condensed buttermilk having approximately a 30% solid content with which the particles are coated; the buttermilk being initially in the proportion of not more than 7% by weight of the product.

GUY I. BROWN.